(12) United States Patent
Gebhardt

(10) Patent No.: US 9,102,858 B2
(45) Date of Patent: Aug. 11, 2015

(54) ABRASIVE GRAIN AGGLOMERATES, PROCESS FOR THE PRODUCTION THEREOF AND THE USE THEREOF FOR PRODUCING ABRASIVES

(75) Inventor: Knuth Gebhardt, Drobollach (AT)

(73) Assignee: CENTER FOR ABRASIVES AND REFRACTORIES RESEARCH & DEVELOPMENT C.A.R.R.D. GMBH, Villach (AT)

(*) Notice: Subject to any disclaimer, the term of this patent is extended or adjusted under 35 U.S.C. 154(b) by 243 days.

(21) Appl. No.: 13/121,643

(22) PCT Filed: Oct. 1, 2009

(86) PCT No.: PCT/EP2009/007048
§ 371 (c)(1),
(2), (4) Date: Mar. 29, 2011

(87) PCT Pub. No.: WO2010/040472
PCT Pub. Date: Apr. 15, 2010

(65) Prior Publication Data
US 2011/0183142 A1 Jul. 28, 2011

(30) Foreign Application Priority Data
Oct. 10, 2008 (EP) .................................... 08017793

(51) Int. Cl.
*B24D 3/02* (2006.01)
*C09K 3/14* (2006.01)
*B24D 3/04* (2006.01)

(52) U.S. Cl.
CPC ......... *C09K 3/1409* (2013.01); *Y10T 428/2982* (2015.01)

(58) Field of Classification Search
None
See application file for complete search history.

(56) References Cited

U.S. PATENT DOCUMENTS

| 4,349,386 | A | | 9/1982 | Davidovitz et al. | |
|---|---|---|---|---|---|
| 5,352,427 | A | * | 10/1994 | Davidovits et al. | 423/328.1 |
| 6,066,189 | A | * | 5/2000 | Meyer et al. | 51/298 |
| 2002/0026752 | A1 | * | 3/2002 | Culler et al. | 51/298 |

(Continued)

FOREIGN PATENT DOCUMENTS

| DE | 103 92 532 B4 | 6/2006 |
|---|---|---|
| DE | 10 2005 007 661 A1 | 8/2006 |

(Continued)

OTHER PUBLICATIONS

J. Davidovits: Solidphase synthesis of a mineral blockpolymer by low temperature polycondensation of alumino silicate polymers. In Full Paper of the communication presented at IUPAC Syposium, Stockholm 1976.

(Continued)

*Primary Examiner* — Ronak Patel
(74) *Attorney, Agent, or Firm* — Law Firm of Ursula B. Day; Ursula B. Day

(57) ABSTRACT

The present invention relates to abrasive grain agglomerates composed of fine-particle primary abrasive grains which are held together by means of a binder based on an aluminosilicate having a molar ratio of $Al_2O_3$ to $SiO_2$ of from 1:2 to 1:20. The particular advantage of these abrasive grain agglomerates is that the binder cures fully at below 450° C., preferably below 400° C., to form abrasive grain agglomerates having an extraordinarily high strength.

13 Claims, 2 Drawing Sheets

100 μm / x 100

(56) References Cited

U.S. PATENT DOCUMENTS

| | | |
|---|---|---|
| 2002/0066233 A1 | 6/2002 | Culler et al. |
| 2002/0095871 A1* | 7/2002 | McArdle et al. ............... 51/298 |
| 2002/0151265 A1* | 10/2002 | Adefris ......................... 451/490 |
| 2006/0134421 A1* | 6/2006 | Zeiringer et al. ............ 428/403 |
| 2008/0064312 A1 | 3/2008 | Sinram et al. |
| 2009/0041975 A1* | 2/2009 | Kodama et al. ............... 428/116 |

FOREIGN PATENT DOCUMENTS

| | | |
|---|---|---|
| EP | 0 494 638 A | 7/1992 |
| EP | 0 518 962 B1 | 12/1994 |
| EP | 1 393 859 A | 3/2004 |
| EP | 2 050 805 A | 4/2009 |
| FR | 2 233 812 A | 1/1975 |
| JP | 2002-079468 A | 3/2002 |
| JP | 2004-315579 A | 11/2004 |
| JP | 2007-152484 A | 6/2007 |
| WO | WO 91/13840 A | 9/1991 |
| WO | WO 01/08848 A | 2/2001 |
| WO | WO 2004/053013 | 6/2004 |

OTHER PUBLICATIONS

J. Davidovits: "Solid phase synthesis of mineral blockpolymer by low temperatures polycondensation of aluminum silicate polymers". Topic III, "New polymers of high stability" (1976); which later on became known under the term of "geopolymers".I.U.P.A.C. International Symposium on Macromolecules, Stockholm; Sep. 1976;.

* cited by examiner

ABRASIVE GRAIN AGGLOMERATES, PROCESS FOR THE PRODUCTION THEREOF AND THE USE THEREOF FOR PRODUCING ABRASIVES

CROSS-REFERENCES TO RELATED APPLICATIONS

This application is the U.S. National Stage of International Application No. PCT/EP20091007048, filed Oct. 1, 2009, which designated the United States and has been published as International Publication No. WO 2010/04072 A2 and which claims the priority of European Patent Application, Serial No. 08017793.4, filed Oct. 10, 2008, pursuant to 35 U.S.C. 119 (a)-(d).

BACKGROUND OF THE INVENTION

The present invention refers to abrasive grain agglomerates on the basis of abrasive grains from the group of conventional abrasive grains, such as for example, corundum, fused corundum, sinter corundum, zirconium corundum, silicon carbide and boron carbide as well as from the group of the super abrasives, such as for example, cubic boron nitride and diamond, and/or mixtures thereof, whereby fine abrasive grains are bonded into compact abrasive grain agglomerates by means of an inorganic binder.

The present invention also refers to a method for the production of such abrasive grain agglomerates and their use in abrasives.

Abrasive grain agglomerates have been known in many variations for a long time and are normally utilized in bonded abrasives such as for example, abrasive disks or coated abrasives such as for example abrasive belts. Abrasive grain agglomerates are normally constructed from single abrasive grains, the primary particles which are bonded into an abrasive grain agglomerate by use of a binder. Binders are either organic or inorganic binders, whereby oftentimes organic binders are phenol resins, while inorganic binders can be ceramic binder materials.

The big advantage of abrasive grain agglomerates is that finely grained abrasive grains can be utilized as primary particles from which the agglomerate grain is then built, which, as compared to the a single grain of the same size, has a completely different degradation mechanism during the abrading process.

While a single grain of comparable size, depending on the pressure conditions during the abrading process, normally becomes dull or becomes destroyed, the abrading conditions with abrasive grain agglomerates can be purposefully selected so that single (worn-out) grains break from the bond formation so that always new cutting edges are formed such that on the one hand, the agglomerate grains retains a long life span and on the other hand, exhibits a cool and homogenous polished pattern. A further advantage of the abrasive grain agglomerates is that finely grained abrasive grains can be utilized for abrading processes and abrading tools which otherwise would not be suitable due to their small grains size.

DE 103 92 532 B4 describes abrasive grain agglomerates which comprise a plurality of abrasive grains that are bonded with a binder material, wherein the binder material has a melting temperature between 500° C. and 1400° C. The DE 103 92 532 B4 also describes a method for the production of such abrasive grain agglomerates where the abrasive grains are mixed with a binding agent and subsequently are subjected to a heat treatment in a rotating tubular kiln between 145° C. and 1300° C. The abrasive grain agglomerates that are so obtained have a total porosity between 35% by volume and 80% by volume, whereby at least 30% by volume of the pores are connected. From this production method elongated agglomerates are obtained with a ratio of length to cross section of at least 5:1. Binders that are utilized are glass-type binder agents, ceramic materials, inorganic materials and combinations of the same. The so obtained abrasive grain agglomerates are most of all used in bonded abrasives in order to control the percent portion and the properties of the porosity in the abrasives and to preserve the porosity in the form of a permeable and connective porosity.

DE 10 2005 007 661 A1 describes abrasive grain agglomerates that are formed by means of a binder in material-interconnecting engagement, and which exhibit an approximately spherical outer shape and are supposed to possess a porosity of at least 35% by volume. These abrasive grain agglomerates are formed from single abrasive grains whose particle size is in the range between 0.05 μm and 10 μm, which are then joined into agglomerates with a diameter in the range between 10 μm and 150 μm. In the abrading tools, these agglomerates are utilized as narrow range classified with a quasi constant graining. As binders organic binders are preferably used, such as for example, phenol resins, polyurethane, epoxy resins, urea resins and poly vinyl butyral. These abrasive grain agglomerates are especially suitable for use in coated abrasives, where they are utilized for very fine abrading treatments of surfaces of work pieces.

The production of abrasive grain agglomerate is in principle quite easy and is mainly based on mixing the single grains with a binding agent so they form an abrasive grain agglomerate and are then subsequently heat treated. Depending on the type of the binding agent used, very different temperature conditions apply.

While with inorganic binding agents normally temperatures apply that are markedly above 500° C., the agglomerates with organic binding agents are normally hardened at relatively low temperatures—between 200° C. and 300° C.

The known inorganic binding agents have the advantage that they can form very strong bonds, which however always requires relatively high temperatures, so that inorganic binder systems are not suitable for temperature sensitive abrasive grains such as for example, eutectic zirconium corundum, cubic boron nitride or diamond, and are thus not used.

The organic binder materials on the other hand have the drawback that the bond itself is less strong. In addition, when using organic binders there is the problem that the mixtures from binders and finely grained abrasive grains have a tendency to stick to the edges of the apparatus. This requires rather high maintenance and cleaning efforts especially when an abrasive grain product change takes place because normally when producing abrasive grain agglomerates, the abrasive grains have to have a narrow grain size distribution. The contamination with larger grains would lead to considerable problems in abrading operations where the main object is a fine treatment of work piece surfaces, such as for example the treatment of decorative lacquer surfaces, where such impurities can lead to scratches which can only be eliminated, if at all, subsequent to the abrading operation and only with a considerable effort. With organic binding agents, aside from the contamination of the apparatus, there is also the issue of environmental problems, as the use of organic binding agents or binders are most often associated with foul smells and health risks.

Thus, the problem still exists to provide a binder system for abrasive grain agglomerates that do not suffer from these drawbacks.

SUMMARY OF THE INVENTION

This problem is solved with the abrasive grain agglomerates composed from a plurality of abrasive grains, wherein the abrasive grains are selected from the group corundum, fused corundum, sintered corundum, zirconium corundum, silicon carbide, boron carbide, cubic boron nitride, diamond and/or mixtures of these bonded together with an inorganic binder, wherein the basis for the binder comprises an alumina silicate water glass and water; wherein the molar ratio of $Al_2O_3$ to $SiO_2$ in the binder is from about 1:2 to about 1:20. Preferred embodiments of the abrasive grain agglomerates according to the present invention are subject of the dependent claims.

It is a further aspect of the present invention to provide a method for the production of abrasive grain agglomerates composed from a plurality of abrasive grains, wherein the abrasive grains are selected from the group corundum, fused corundum, sintered corundum, zirconium corundum, silicon carbide, boron carbide, cubic boron nitride, diamond and/or mixtures of these bonded together with an inorganic binder. This aspect is solved by a method including the steps of mixing the abrasive grains with a binder; drying the so obtained abrasive grain agglomerates green bodies at a temperature between 100° C. and 150° C.; and hardening the dried abrasive grain agglomerates at a temperature of about 200° C. to about 450° C.; wherein the binder is an aluminum silicate, water glass and water, wherein the molar ratio of $Al_2O_3$ to $SiO_2$ in the binder is from about 1:2 to about 1:20.

In 1976, a new type of ceramic work material was already described in the publication J. Davidovits: "Solid phase synthesis of mineral blockpolymer by low temperatures polycondensation of aluminum silicate polymers". I.U.P.A.C. International Symposium on Macromolecules, Stockholm; September 1976; Topic III, "New polymers of high stability" (1976); which later on became known under the term of "geopolymers". Geopolymers refers to a group of aluminum silicate material which, similar to the organic polymers, can be produced via a polycondensation process, while being purely inorganic in nature, they exhibit a high thermal and chemical stability. The building blocs of geopolymers are $SiO_4$- and $AlO_4$-tetraheders that agglomerate during geopolymerisation into three-dimensional networks.

EP 0 58 962 B1 describes binding agents on the basis of geopolymers, which, aside from the silicate- and aluminum groups, comprise at least one complex alkali fluoride which lowers the hardening speed of the geopolymers and thus controls the polycondensation.

Geopolymers as binders for abrasive grain agglomerates have as yet not been considered by the experts or have not yet been utilized, since the formation of geopolymers requires a high concentration of solid matter, wherein the concentration of the dry substance must be above 60% by weight, for the successful course of a polycondensation. When forming abrasive grain agglomerates however, normally binder agents that are diluted with water are used in order to obtain a homogenous wetting of the abrasive grain surface and to realize agglomeration of the abrasive grains under formation of bonding bridges, wherein the firm embedding of the abrasive grains into a matrix should be avoided. For this purpose, normally diluted industrial water glasses or colloidal silicic acids are utilized whose solid matter content is far below the 60% by weight as required for the geopolymers. It was surprisingly found that it is possible to obtain strong and stable agglomerates with the aid of a reactive $Al_2O_3$ and $SiO_2$ (alumina silicate) containing and water diluted binder mixture at temperatures below 450° C.

This was the more surprising that since at a ratio of $Al_2O_3$ to $SiO_2$ according to the present invention of approximately 1:2 to 1:20, normally strong and dense geopolymers are not being formed but only pure viscous silicate phases that are not part of a three-dimensional network and which when heated normally blow up forming bubbles, so that at temperatures above 300° C., normally a porous body results of which such a firm bonding was never expected.

As starting material for the aluminum silicate metakaolin, flue ash, smelting slag, rock dusts, fine sands, and activated clays can be utilized. These materials are very finely grained and have sufficient activity for forming alumina silicate gels via polycondensation reactions of the silicic and alumina silicic components.

In addition to these raw materials which accumulate in large amount as a side product or a waste product of the energy production and from process manufacturing, any other materials can also be utilized that contain aluminum oxide and silicon oxide in sufficient quantities and in sufficiently reactive form, in order to initiate the polycondensation reaction and form three-dimensional networks of $SiO_4$- and $AlO_4$-tetraheders. Thus, it has been shown that instead of aluminum silicate, also reactive aluminum oxides or aluminum hydroxides together with $SiO_2$ enriched water glasses can be utilized.

In addition to the aluminum silicate, which is preferably used in a molar ratio of $Al_2O_3$ to $SiO_2$ from 1:2 to 1:20, the binder system contains water glass, water and in a preferred embodiment, at least one complex alkali fluoride. In a further preferred embodiment, the binder system contains additionally at least one phosphate, whereby in that case, the three-dimensional networks in addition to the $SiO_4$- and $AlO_4$-tetraheders also contain $PO_4$-tetraheders. Relative to the abrasive grain primary particles, approximately 1% by weight to about 15% by weight of binder are used, wherein the binder is composed of about 20% by weight to about 80% by weight of water glass, about 20% by weight to about 60% by weight water and about 1% by weight to about 25% by weight aluminum silicate relative to the total weight of the binder.

The advantageously added complex alkali fluoride is selected from the group of $Na_3AlF_6$, $K_2NaAlF_6$, $K_2SiF_6$, $NaBF_4$, and $KBF_4$. Advantageously, the weight portion of complex alkali fluoride is about 1% by weight to about 15% by weight relative to the total weight of the binder.

In addition, the binder mixture can contain inorganic phosphates, which advantageously are also added in the range between 20% by weight and 60% by weight relative to the total weight of the binder are added to the binder. Thereby, the phosphate anions are incorporated as $PO_4$-tetraheders into the three-dimensional aluminum silicate lattice.

Besides the afore-stated components, the binder can additionally include fillers and/or auxiliary abrasives. For this purpose, all known filler material and auxiliary abrasives from the group of sulfides, phosphates, carbonates and/or halogenide and/or sulfide, phosphate, carbonate and/or halogenide containing complex compounds from the group of the elements sodium, silicon, potassium, magnesium, calcium, aluminum, manganese, copper, zinc, iron, titanium, antimony and/or tin can be utilized.

The special advantageous of the afore-stated binders is that it is hardenable at a temperature of less than 450° C., but still retains a comparable firmness of the known inorganic binders.

The abrasive grain agglomerates according to the present invention have an average diameter between 0.5 mm and 3 mm, wherein the average grain size of the primary particles is between 30 μm and 200 μm.

The production of the abrasive grain agglomerates is relatively uncomplicated, wherein the abrasive grain primary particles having an average grain size between 30 μm and 200 μm are mixed with a binder whereby the primary particles agglomerate aggregate into abrasive grain agglomerates under constant stirring. By varying the abrasive grain size, the mixing speed, the amount of binder and the mixing time, the agglomerate size can be influenced across a wide range. Alternatively, the single components of the binder mixture can be added serially to the abrasive grains, so that for example the aluminum silicate is first mixed with the abrasive grains and subsequently the water glass is added.

The so obtained abrasive grain agglomerates green bodies are subsequently dried at a temperature between 100° C. and 150° C. and thereafter the dried abrasive grain agglomerates hardened at a temperature between about 200° C. to about 400° C.

The abrasive grain agglomerates according to the present invention have a porosity of about 10% by volume to about 50% by volume. The abrasive grain agglomerates according to the present invention thus exhibit a high degree of fracture resistance, which when measured according to Vollstädt normally lies between 10 and 60 Newtons.

The measurement of the fracture resistance was carried out with a test apparatus which was developed for firmness tests for diamonds (Vollstädt, Diatest SI). With this method, the abrasive grain is broken in a piston cell and the maximal force (compressive fracture force=CFF) at which the grain is broken into pieces is recorded. For this purpose, the pressure sensor is adapted for the measurement range from 0 to 200 Newton. For preparing the samples, a fraction, in the range between 850 μm and 710 μm (=20 mesh to 24 mesh) is screened out, which were then further sorted relative to their grain size via a vibrating table. From the obtained measurement fractions, 150 to 200 single measurements were each carried out, so that statistically sufficiently certain values for the average grain strength were obtained.

Based on examples, in the following paragraphs, the present invention is described in detail.

Example 1

Sample Production 3 kg of abrasive grains each were mixed with 300 g fused corundum (micro grain d50=10 μm), 25 g potassium hexafluorsilicate ($K_2SiF_6$), 25 g meta kaolin (opacilite ex Imerys) in an intensive mixer (type R01, Eirich) for 5 minutes in reverse direction flow. For the production of granulate, a portion of the mixture was provided on a rotating pelletizing plate (type TR04, Eirich) and sprayed with a 40%, diluted water glass solution. Successively, grain mixture with waterglass was added while the granulate that formed due to gravitational forces are caught at the side wall of the pelletizing plate. In total, 500 g of potassium water glass (42/43 Mörsil H, Cognis) were added. Of the so obtained granulates, a fraction in the range between 1180 μm and 850 μm was screened out and subsequently dried for an hour at 100° C. and then calcined in a rotational dryer at 350° C. As abrasive grains were utilized zirconium corundum (ZK40, Treibacher Schleifmittel) grit number P120 (Experiment 1), as grain mixture P100/P150 in a ratio 1:3 (Experiment 2), as grain mixture P120/P150 in a ratio of 1:2 (Experiment 3) and as grain mixture P120/P220 in a ratio of 1:2 (Experiment 4). In addition, a regular corundum with grit number P320 (Experiment 5) was also utilized. The measured fracture resistance according to Vollstädt is compiled in the following Table 1.

TABLE 1

| Experiment No.: | Primary body (grain type/ grain/mixture ratio) | Average grain size | Agglomerate Size (μm) | Porosity (%) | OFF (N) |
|---|---|---|---|---|---|
| 1 | ZK40 P120 | 120 | approx. 800 | approx. 40 | 20.4 |
| 2 | ZK40 P100/P150 (1:3) | 150/100 | approx. 800 | approx. 30 | 25.3 |
| 3 | ZK40 P120/P220 (1:2) | 120/80 | approx. 800 | approx. 20 | 30.7 |
| 4 | ZK40 P120/P220 (1:2) | 120/65 | approx. 800 | approx. 20 | 36.9 |
| 5 | FRPL P320 | 45 | approx. 800 | approx. 15 | 41.5 |

From the CFF values of Table 1, it is shown that the agglomerates can attain an extraordinary fracture resistance at a predetermined porosity in the range between about 10% by volume and about 40% by volume. Obviously, this fracture resistance of the agglomerates, when using relatively coarse grit numbers, can be increased by not utilizing pure grain fractions but mixtures of grains, where by adding fine grains, the numbers of bonding bridges are increased and the total agglomeration of the abrasive grain agglomerate is being strengthened. In the afore-described examples, high fracture resistance is realized only after a bimodal grain distribution, as relatively coarse primary grains are used for an abrasive grain agglomerate with a comparably relatively small diameter, so that an additional fine fraction is required in order to form sufficiently many bonding bridges and to thus provide the agglomerate a sufficient firmness.

It is not necessary to use the same abrasive grain type as a fine fraction, which was also used as a primary grain but any abrasive grain type from the group of corundum, fused corundum, sinter corundum, zirconium corundum, silicon carbide and boron carbide, cubic boron nitride or diamond can be used as primary grain, so that especially when using expensive primary grains, it offers itself to use less expensive abrasive grains such for example corundum or fused corundum as fine fraction. The average size of the fine fraction is in the area of about 0.5 μm to about 30 μm.

As shown in example No.: 5, wherein a unimodal grain distribution with a very fine grain (P320) was used, the above cannot be generalized.

In general, the fracture resistance of the agglomerates depends on the agglomerate diameter and the grain size of the primary grain particles. It should be noted that most of all it depends on the purpose of use in order to select the grain size and grain distribution for the primary grain size. Especially when using as primary grains, grains of a finer grade, high resistance to fracture can be realized also with unimodal grain distributions.

In the afore-described examples, relatively large agglomerates were produced and measured. It should be noted in general that with diminishing agglomerate size, the grain fracture rate increases, however, this applies only in the case where primary grains size and agglomerate size have been coordinated.

Example 2

Sample with Phosphate Portion 3.6 kg abrasive grain (ZK40, Treibacher Schleifmittel P120/P220, 1:2) with 400 g fused corundum (micro grain d50=10 μm), 5 g calcium carbonate, 5 g magnesium carbonate and 25 g meta kaolin (Opacilite, Imerys) are mixed in an intensive mixer (Type R01, Eirich) for 5 minutes in reverse direction flow. To produce granulate, a portion of the mixture was placed on a rotating pelletizing plate (type TR04, Eirich) and alternatively sprayed with a mixture of a 40%, diluted water glass solution (42/43 Mörsil H, Cognis) and an aluminum phosphate solution (FFB 705, Budenheim) in a ratio of 1:1. Successively, grain solution and water glass or aluminum phosphate-mixture is added, while the granulate which is forming is captured due to gravity at the side of the pelletizing plate. From the so obtained granulates, a fraction in the range between 1180 μm and 850 μm is screened out and subsequently dried for an hour at 100° C. and then calcined at 350° C. in a cylindrical rotary kiln. The so obtained abrasive grain agglomerate with an average agglomerate size of about 950 μm and a porosity of about 20% by volume was measured with fracture resistance of 45.8N according to Vollstädt.

Example 3

Abrading Test

For the abrading test, vulcanized fiber disks with a diameter of 150 mm were produced from abrasive grain agglomerates which analog to Example 1 are produced from regular corundum and zirconium corundum grit sizes, wherein the granulate grains are spread onto the fiber disk that has been coated with resin but without any additional abrading active fillers. The fiber disks were tested against a round rod of chromium-nickel-stainless steel (42CrMoS4V) having a diameter of 20 mm at a speed of 3000 revolutions per minute and a pressure of 9.5 Newton per $cm^2$. Abrasion was carried out in intervals of two minutes each. As a comparison, zirconium corundum (ZK40, Treibacher Schleifmittel) having a coarse grit size (P36) was used. The results of the abrading tests are illustrated in Table 2 and graphically represented in FIG. 3.

TABLE 2

| Experiment Nr. | Abrasive grain type | Primary grain/mixing ratio | Agglomerate size | Removal rate | Abrading yield |
|---|---|---|---|---|---|
| 6 (disk34) | FRSK | F120/F220 (1:1) | approx. 500 | 7.1 | 111 |
| 7 (disk35) | ZK40 | F120/F220 (1:1) | approx. 500 | 7.2 | 113 |
| 8 (disk36) | ZK40 | F36 | approx. 500 single grain | 6.4 | 100 |
| 9 (disk37) | FRPL | P120 | approx. 500 | 4.6 | 72 |

From the results of Table 2 it is shown that the abrasive grain agglomerate has a removal rate comparable to a compact abrasive grain when abrasive grain mixtures are used for the formation of agglomerates. When utilizing a purely coarse abrasive graining for the production of an abrasive grain agglomerate, obviously the stability of the agglomerate is subsequently not sufficient to produce a constant removal rate across an extended period of time. This is especially shown in the graphic illustration of the test results in the context with microscopic images of the agglomerates, where it should be noted that this is not generally the case, but depends on the grain size of the primary grains and the size of the agglomerates formed therefrom.

BRIEF DESCRIPTION OF THE DRAWING

The present invention is additionally described with reference to the drawings, whereby it is shown in.

DETAILED DESCRIPTION OF PREFERRED EMBODIMENTS

Figure 1:
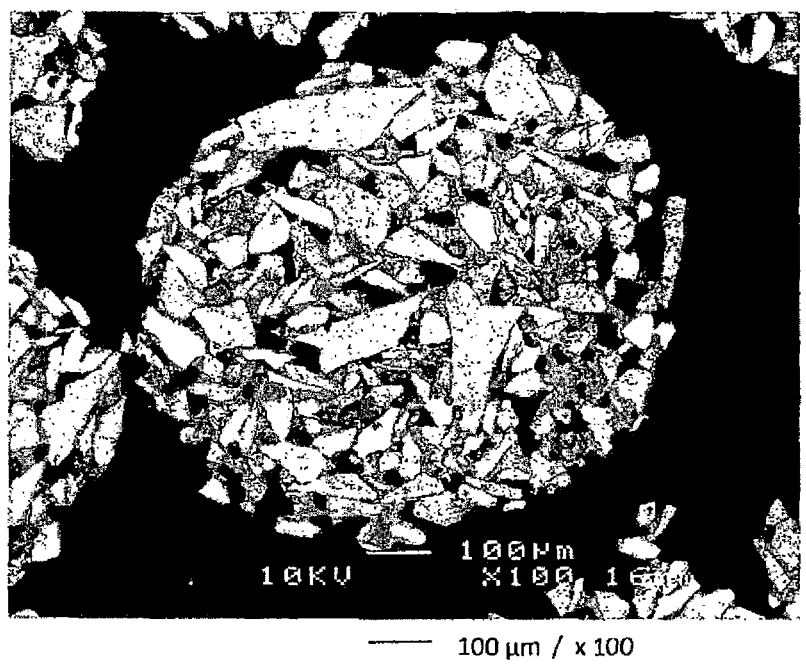
FIG. 1 a scanning electron microscope of a micro section image of an agglomerate grain in 100 fold enlargement, FIG. 2 a scanning electron microscope image of a micro section of a detail from an agglomerate grain in 3,500-fold enlargement.

FIG. 1 shows a scanning electron microscope image of a granulate grain according to the present invention in 100-fold enlargement, wherein the primary grains are used as abrasive grains on the basis of zirconium corundum in grit size P120 and P220 in a ratio of 1:2. The abrasive grains are shown as light areas, the bonding bridges are shown as gray areas between the light abrasive grains and the pores are shown as dark areas. The abrasive grain agglomerate possesses a high porosity and the single abrasive grains are bonded to each other via relatively small bonding bridges- or links, wherein the agglomerate has a relatively incompact appearance. The more surprising are the high grain strength values that are measured on them and which reflect the enormously high linkage force of the aluminum silicate containing binder. In the present case, the abrasive grain agglomerate itself has a diameter of about 850 μm.

In this illustration, it becomes clear from the selected grain size of the primary particles and the agglomerate size realized therefrom, a bimodal grain distribution should be advantageous at least relative to fracture resistance, as in this manner an abrasive grain agglomerate can be realized (see (FIG. 1) that is substantially more compact than is possible in an abrasive grain agglomerate when using exclusively coarse primary particles.

Figure 2:
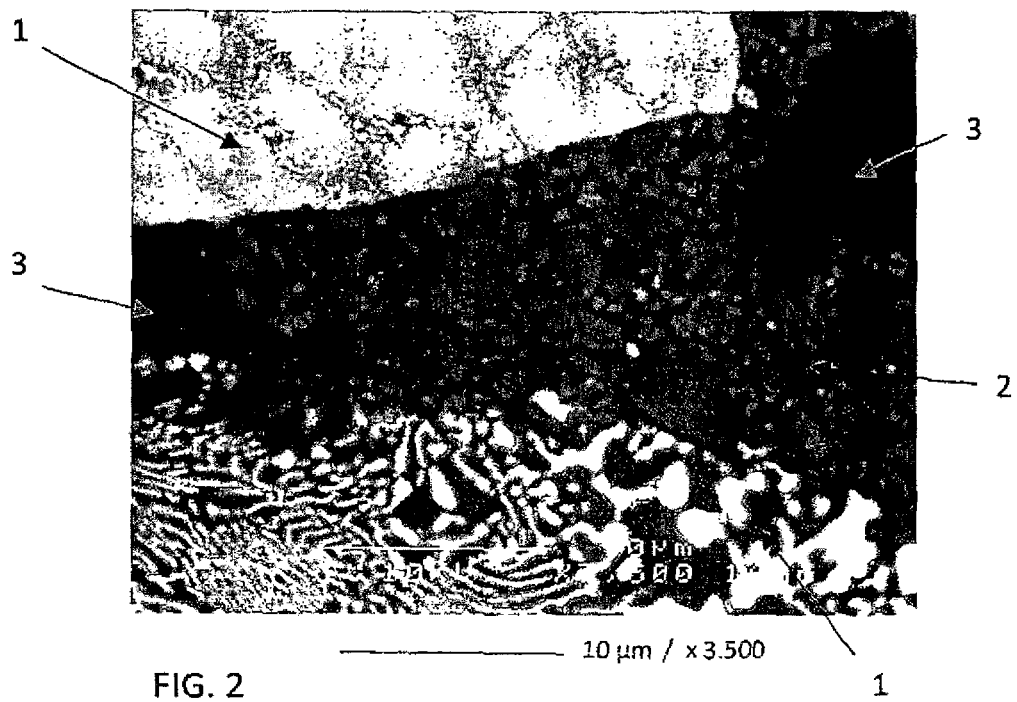

FIG. 2 shows a detail of an electron microscope image of a polished section of an agglomerate grain in a 3,500 fold enlargement. A bonding bridge 2 is shown here as a gray area between two lighter areas, which represent the zirconium corundum-abrasive grains 1. The bonding bridge 2 itself shows a structure which originates from the bonding bridges 2 having a high portion of micro abrasive grains with an average diameter of about 10 μm as filler, in addition to the binder, whereby the entire bonding bridge 2 is firmed up.

The different structures of the abrasive grains 1 is based on the zirconium corundum abrasive grain 1 having a very homogenous distribution of zirconium oxide and aluminum oxide as seen in the upper area of the image, while the lower area of the image shows the zirconium corundum abrasive grain 1 as an non-homogenous micro structure with $Al_2O_3$-segregations. To the right and left of the bonding bridge 2, pores 3 are shown as dark areas.

Figure 3:
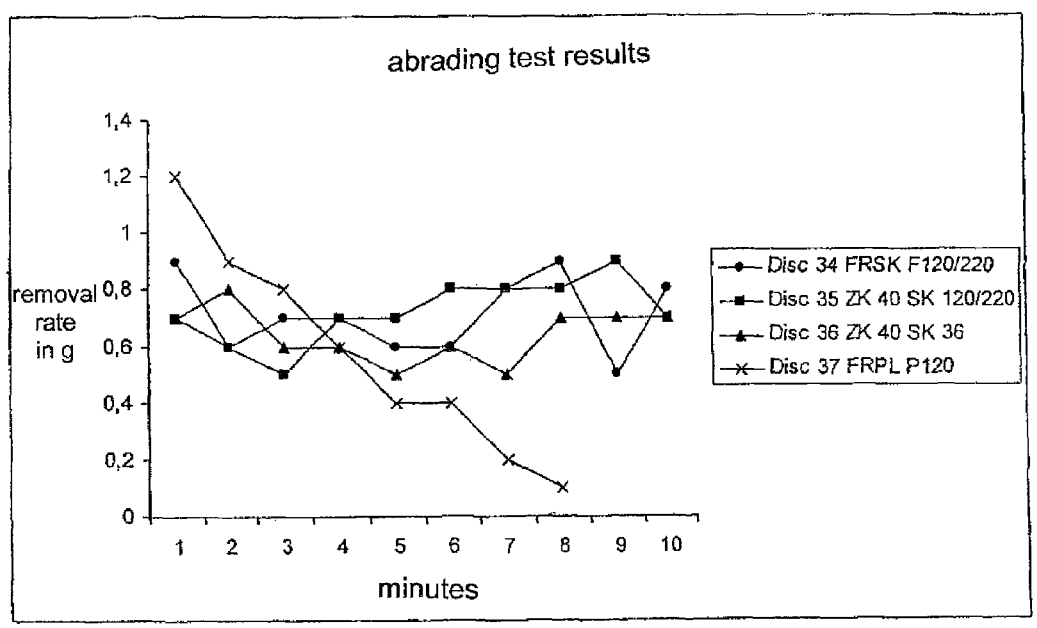
FIG. 3 a graphic illustration of an abrading test of Example 2.

FIG. 3 shows a graphic representation of a grinding test of example 3. There, it is clearly shown that the abrasive grain agglomerates exhibit a removal rate comparable to a compact abrasive grain, where the firmness of the abrasive grain agglomerate is however dependent on the grain composition or the grain size. Thus, the abrasive grain agglomerate from a pure, relatively coarse fused corundum primary particle P120 (Nr. 9), at the start of the abrading operation, has a high grinding output, but collapses relatively fast after a few abrading cycles. However, this is not due to a lack of bonding strength but is solely based on the size of the abrasive grain and the unfavorable static arrangement in the abrasive grain agglomerate. This becomes especially clear through FIG. 1, where it is shown that only by using different graining, a relatively compact agglomerate grain is realized, most of all by adding a fine grain fraction. This is further shown in the results of the abrading tests of further samples with abrasive grain mixtures, which exhibit a removal rate which is comparable to that of a coarse abrasive grain.

In the abrading test represented by diagram, in addition to the zirconium corundum, a regular corundum was also tested as an abrasive grain agglomerate as compared to a compact zirconium corundum. It is of particular interest that the abrasive grain agglomerate from regular corundum exhibits a removal rate comparable, if not higher, than that of compact zirconium corundum grains or zirconium corundum abrasive grain agglomerates at least during the first abrading cycles. It is interesting, in particular, because normally regular corundum exhibits a markedly lower removal rate than a zirconium corundum, which according to its self-edging mechanism repeatedly forms new cutting edges and thus generates a correspondingly high removal rate, while a regular corundum becomes dull or collapses after only a few operations. Obviously, a similar self-sharpening mechanism is now found, wherein the bonding between the single primary particles are sufficiently strong to avoid collapse of the entire agglomerate.

In the afore-described examples and figures, only a few embodiments have been detailed and the corresponding tests shown should not be taken as a limitation in any way. With reference to these examples, the extraordinary stability of the abrasive grain agglomerates and their excellent abrading capacity are demonstrated which is due to the sintering glass like bonding at unusually deep temperatures according to the present invention.

Besides comparing the material removal to the compact abrasive grain of corresponding size, the small surface roughness that occurs in the abrasive grain agglomerate according to the present invention is emphasized which makes the abrasive grain agglomerates suitable for abrading operations where high removal rate and high surface quality are demanded at the same time.

In general, the abrasive grain agglomerates according to the present invention, can be utilized advantageously for the production of coated abrasives such as for example abrasive belts or abrasive papers, or for the production of bonded abrasives, such as for example porous abrasive disks.

What is claimed is:

1. An abrasive grain agglomerate comprising a multitude of primary abrasive grains, said abrasive grains are selected from the group consisting of corundum, fused corundum, sintered corundum, zirconium corundum, silicon carbide, boron carbide, cubic boron nitride, diamond and mixtures thereof bonded together with an inorganic binder into an abrasive grain agglomerate,
    wherein the binder comprises,
    about 1 to about 25% by weight of an alumina silicate,
    about 20 to about 80% by weight of water glass and
    about 41 to about 60% by weight of water; each weight relative to the total weight of the binder,
    wherein a molar ratio of $Al_2O_3$ to $SiO_2$ in the binder is from about 1:2 to about 1:20 and the binder is hardened at temperatures of ≤450° C.

2. The abrasive grain agglomerates according to claim 1, wherein the binder further comprises a complex alkali fluoride, selected from the group consisting of $Na_3AlF_6$, $K_2NaAlF_6$, $Na_2SiF_6$, $K_2SiF_6$, $NaBF_4$ and $KBF_4$, with a weight portion of the alkali fluoride, of about 1% by weight to about 15% by weight relative to the total weight of the binder.

3. The abrasive grain agglomerates according to claim 1, wherein the binder further comprises a phosphate with a weight portion of about 20% by weight to about 60% by weight relative to the total weight of the binder.

4. The abrasive grain agglomerates according to claim 1, wherein the portion constituting the binder is about 1 to about 15% by weight relative to the abrasive grains bonded to each other.

5. The abrasive grain agglomerates according to claim 1, wherein the aluminum silicate is selected from the group consisting of meta kaolin, flue ash, smelting slag, rock dusts, fine sands and activated clays.

6. The abrasive grain agglomerates according to claim 5, wherein the aluminum silicate is a three-dimensional network of $SiO_4$- and $AlO_4$-tetrahedrons generated through polycondensation from reactive $Al_2O_3$ and $SiO_2$.

7. The abrasive grain agglomerates according to claim 6, wherein the three-dimensional network in addition includes $PO_4$ tetrahedrons.

8. The abrasive grain agglomerates according to claim 1, wherein the binder further comprises at least one of: filler material and auxiliary abrasive agents selected from the group consisting of sulfides, phosphates, carbonates and/or halogen containing complex compounds selected from the group consisting of elements Na, Li, K, Mg, Ca, Al, Mn, Cu, Sn, Fe, Ti, Sb and Zn.

9. The abrasive grain agglomerates according to claim 8, wherein the binder includes a portion of about 2% by weight to about 15% by weight fine grain selected from the group consisting of corundum, fused corundum, sinter corundum zirconium corundum, silicon carbide, boron carbide cubic boron nitride, diamond and mixtures thereof as a filler material, wherein the fine grain has an average grain size between about 0.5 μm and about 30 μm.

10. The abrasive grain agglomerates according to claim 9, wherein the primary abrasive grain includes a bimodal grain distribution, wherein a difference in percent between an average grain size is between about 30% and about 70%.

11. The abrasive grain agglomerates according to claim 1, wherein the average grain size of the primary particles is between 30 μm and 200 μm and the average diameter of an abrasive grain agglomerate is between 0.05 mm and 3 mm.

12. The abrasive grain agglomerates according to claim 1, wherein porosity of an abrasive grain agglomerate is about 10% by volume to about 50% by volume.

13. The abrasive grain agglomerates according to claim 1, wherein the abrasive grain agglomerates have a fracture resistance (CFF) according to Vollstädt of at least 10N, preferably at least 40N.

* * * * *